Sept. 18, 1928.
A. D. ROSE
1,684,598
DIAL
Filed Jan. 30, 1926
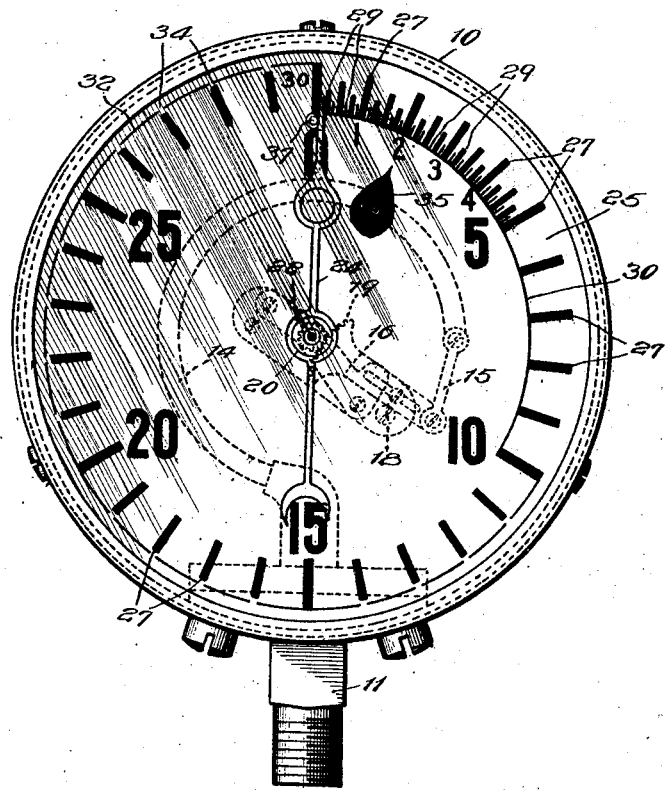
Witnesses:
William P. Kilroy
Harry R. L. White
Inventor:
Alexander D. Rose
By Hill & Hill
Attys Patented Sept. 18, 1923.

1,684,598

UNITED STATES PATENT OFFICE.

ALEXANDER D. ROSE, OF CHICAGO, ILLINOIS, ASSIGNOR TO JAS. P. MARSH & COMPANY, OF CHICAGO, ILLINOIS, A CORPORATION OF ILLINOIS.

DIAL.

Application filed January 30, 1926. Serial No. 84,907.

My invention relates to dials and particularly to dials adapted to be used upon gauges for indicating variations in pressure.

A particular object of the invention is to provide an improved dial for a pressure gauge, which dial has the zero so positioned that the pointer or dial of the gauge is in a substantially vertical position when indicating zero pressure.

Another particular object of the invention is to provide improved dials for pressure gauges in which dials the scales will be of maximum length for any given diameter.

The invention has among its other objects the production of devices of the kind described, which are exceedingly convenient and satisfactory for use wherever found applicable.

Still another particular object of the invention is to provide a dial which will unmistakably call the attention of an observer, in which one of a plurality of ranges of pressure, the instrument of which the dial forms a part is operating.

One form of the invention is embodied in a dial forming part of a pressure gauge, the dial having markings extending through 360° which indicate various ranges of pressures in such manner that even an untrained observer will note in which one of these a pointer forming part of the dial is operating. The pointer or hand of the gauge assumes a substantially vertical position at atmospheric pressure.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

The drawing shows a gauge in elevation having a dial embodying the invention.

Referring to the drawing wherein I have shown a preferred form of the invention embodied in a dial which forms a part of the gauge adapted to indicate variations in pressure, the reference character 10 designates a casing which contains the mechanism of the gauge, the casing being provided with a tubular fitting 11 whereby the gauge may be mounted upon a boiler or the equivalent. The tubular fitting 11 carries and communicates with a Bourdon tube 14 which is connected by a link 15 to a lever 16 pivoted at 18 and the lever 16 is provided with gear teeth 19 which mesh with a pinion 20 rigidly secured upon a shaft or pin 22 rotatably journaled in the casing 10. A pointer or hand 24 secured to the pin 22 is arranged to be moved over a dial 25 provided with suitable markings.

Briefly, the operation of the above described device is substantially as follows: When the gauge is mounted upon a boiler, or the equivalent, a change of pressure in the boiler will cause the Bourdon tube 14 to expand or contract, as the case may be, so that the lever 16 will rotate the pinion 20, the shaft 22 and the pointer 24 into a position wherein it will indicate upon the dial 25 the pressure obtaining within the boiler.

With the exception of the dial 25, I am not concerned with the details or construction of the above described gauge and my invention is limited to such details only to the extent indicated in the appended claims.

In the illustrated embodiment of the invention, the dial 25 is adapted to indicate a range of pressures extending from atmospheric pressure to a pressure of 30 pounds per square inch. However, it is to be understood that my invention is not limited to this particular range of pressures as the dial may be constructed to indicate any desired range of pressures. As shown, the dial is preferably provided with a plurality of radially disposed markings or lines 27 adapted to indicate pounds, every fifth line 27 being made heavier to facilitate the reading of the dial which is particularly adapted for use in steam-heating systems, or the equivalent, operated at relatively low pressures. For this reason, the first five divisions of the dial are the divisions which indicate a range of pressures extending from atmospheric pressure to a pressure of 5 pounds per square inch and are provided with a plurality of radially disposed markings or lines 29 adapted to divide the divisons into spaces indicating a rise or fall of 2 ounces of pressure. It will be noted that the first five divisions of the dial cannot be confused with the remainder of the divisions, as the remaining dial divisions are preferably left undivided. Joining the inner ends of the lines 27 of the divisions which indicate pressures extending from atmospheric pressure to and including a pressure of 10 pounds per square inch is an arcuate line 30, which does not extend to the other lines 27. Obviously, those divisions of the dial that indicate pressures extending from atmospheric pressure to and including a pressure of 10 pounds per square inch are clearly defined and cannot be confused with the divisions indicating higher pressures. To further differentiate between the divisions indicating pressures of 10 pounds per square inch or less and the divisions indicating higher pressures, I preferably join the outer ends of the lines 27 of the divisions indicating said higher pressures by an arcuate line 32, which does not extend through the divisions marking the lower pressures. The line 32 is preferably broken as at 34—34 to give it a distinctive appearance. As apparatus upon which gauges of this character are employed is generally operated at or about a certain pressure, I preferably indicate that pressure by a marking 35, or the equivalent, the marking 35 in this instance being a relatively large arrowlike marking pointing to that line 27 which indicates a pressure of 2 pounds. It is, of course, understood that the marking 35 may be arranged at any point upon the dial 25.

I generally prefer to provide a pin 37 against which the pointer 24 will rest when atmospheric pressure obtains within the Bourdon tube 14, the pin being also arranged to engage the pointer when it tends to pass in a clockwise direction from the divisions indicating high pressures to the divisions indicating low pressures. This prevents the pointer 24 from apparently indicating a relatively low pressure, when, in fact, it is indicating a pressure of more than 30 pounds per square inch.

It is obvious that an observer could not fail to note in which range of pressures the pointer 24 was operating, if the observer but glance at the gauge, as the divisions indicating pressures up to and including 5 pounds per square inch are provided with the lines 29, which clearly distinguish these divisions from the remaining dial divisions. Also, if the pointer happens to be positioned in the divisions indicating pressures from 5 pounds per square inch up to and including 10 pounds per square inch, the observer will readily note the fact as the arcuate line 30 passes through these divisions. Generally, a safety valve is operatively connected with the apparatus upon which the gauge is positioned, the safety valve being adapted to function at some predetermined pressure. In the illustrated embodiment of the invention this predetermined pressure will be 10 pounds per square inch. Obviously, when it is noted that the pointer is nearing the end of the arcuate line 30, the attendant will realize that the safety valve is about to function and would in most instances regulate the apparatus to prevent loss of steam.

My improved dial is particularly advantageous in that the scale reads through 360° and thus permits larger divisons to be employed to denote the units of pressure. This arrangement permits the zero to be positioned at the top of the dial so that the hand or pointer shown is in a substantially vertical position when atmospheric pressure obtains within the Bourdon tube. Heretofore, as far as I am aware, the dials for pressure gauges have had the zeros so positioned that the pointers or the hands will be disposed at angles to the vertical when pointing to the zero divisons. It has been the practice to compensate for the drag this occasions upon the Bourdon tube, or upon any equivalent means used in place of the Bourdon tube, as considerable difficulty has been experienced in having the pointer or hand return accurately to the zero position when the pressure falls. I am aware that dials reading through 360° have been provided for scales and for other devices, but as far as I know, no one has suggested producing a dial of the character described adapted for use upon pressure gauges.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A dial having a series of radially disposed markings, symbols assigning values to said markings, a line connecting the lower extremities of a portion only of said markings, and a second line connected with another series of said radially disposed markings and of dissimilar appearance to the first named line, to thereby strikingly contrast one series of the markings from another series of the markings.

2. A dial having a series of radially disposed markings, symbols assigning values to said markings, and a line positioned adjacent the lower portions of only some of said markings, and a secondary line positioned adjacent the upper ends of a portion only of said markings, said lines contrasting different portions of the series from each other.

3. A dial having a series of radially disposed markings, and a series of secondary smaller radial markings interposed between a portion only of said first named radial portions for permitting measurements of slight pressure variations for a predetermined initial zone of said first named markings, a line positioned near the upper portion of another portion of said radially disposed markings, to strikingly contrast one zone of said markings from another zone of said markings.

4. A dial having a series of radially disposed markings, symbols assigning values to some of said markings, a line connecting the lower extremities of at least a portion of said markings, and a second line connected with another series of said radially disposed markings, and of dissimilar disposition to the first named line to thereby strikingly contrast one series of the markings from another series of the markings.

5. A dial having a series of closely disposed radial markings, symbols assigning values to said markings, a second series of radially disposed markings spaced relatively further apart than the first named series, a line connecting the lower extremities of the first named series of closely disposed markings, and a second line dissimilarly disposed connecting at least some of the second series of markings.

In testimony whereof, I have hereunto signed my name.

ALEXANDER D. ROSE.